United States Patent [19]

Wiley

[11] Patent Number: 5,613,427
[45] Date of Patent: Mar. 25, 1997

[54] CULINARY SHEET AND PAN LINER

[76] Inventor: Lien Wiley, 2164 Brownstone Creek Ave., Simi Valley, Calif. 93063

[21] Appl. No.: 541,166

[22] Filed: Oct. 11, 1995

[51] Int. Cl.$^6$ .............................. A47J 37/10; B32B 5/16
[52] U.S. Cl. ........................ 99/446; 99/450; 428/317.9; 442/378; 442/380
[58] Field of Search .......................... 99/400, 446, 450; 428/242, 317.9, 237, 264, 281, 283

[56] References Cited

U.S. PATENT DOCUMENTS

| | | | |
|---|---|---|---|
| 4,317,856 | 3/1982 | Huthwelker et al. | 428/242 X |
| 4,447,492 | 5/1984 | McKaveney | 428/328 |
| 4,892,782 | 1/1990 | Fisher et al. | 428/242 X |
| 5,354,603 | 10/1994 | Errede et al. | 428/317.9 X |
| 5,393,603 | 2/1995 | Toyoda et al. | 428/317.9 X |

*Primary Examiner*—David Scherbel
*Assistant Examiner*—Reginald L. Alexander
*Attorney, Agent, or Firm*—John J. Posta, Jr.

[57] ABSTRACT

The improved culinary sheet is useful in the production of a culinary pan liner, such as a pie pan liner or the like. The sheet and liner are characterized by having a matrix of either a body of cellulosic fibers or a thermoplastic film, or both, in which are substantially uniformly distributed a plurality of discrete metal foil particles. The foil can be one or more of aluminum foil, tin foil, titanium foil, bronze foil, brass foil or copper foil. The concentration of foil particles in the matrix varies to control the strength, thermal properties and other characteristics of the sheet and liner. Preferably, the sheet and liner define a plurality of openings extending from the upper surface to the lower surface of the sheet and liner and disposed along the length and width of the sheet and liner. The openings control thermal and moisture transfer through the sheet and liner. The liner and sheet can be multi-ply with plies being bonded together with layers of wax or the like. The sheet and lienr can have the metal foil particles in both the thermoplastic film and body of cellulosic fibers, such as paper, where both are present.

19 Claims, 2 Drawing Sheets

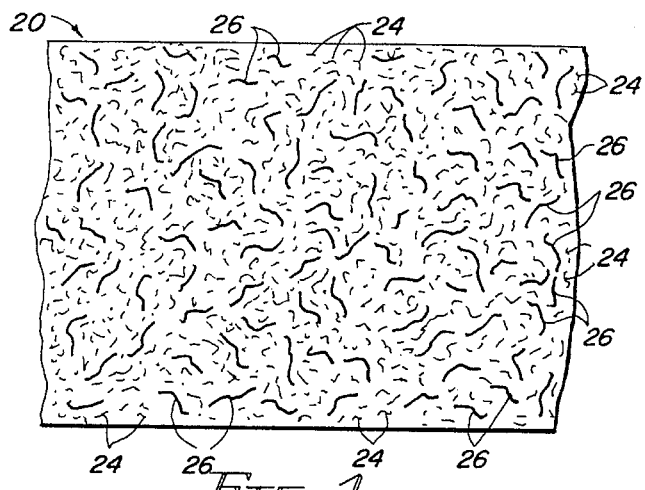
FIG. 1
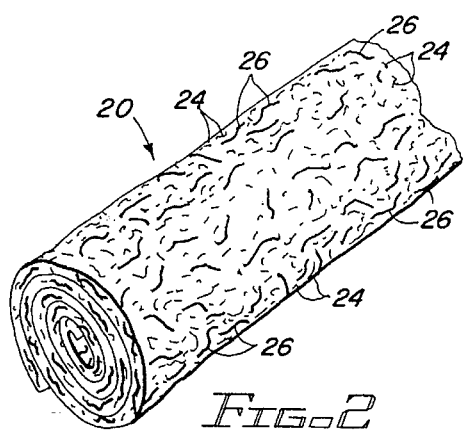
FIG. 2
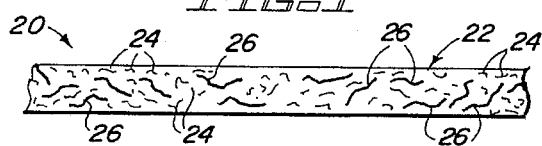
FIG. 3
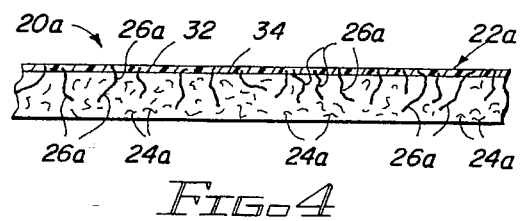
FIG. 4
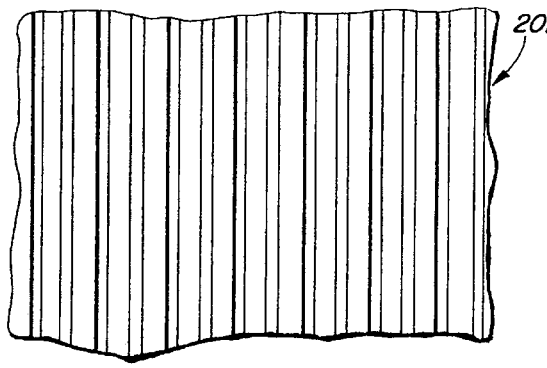
FIG. 5
FIG. 6
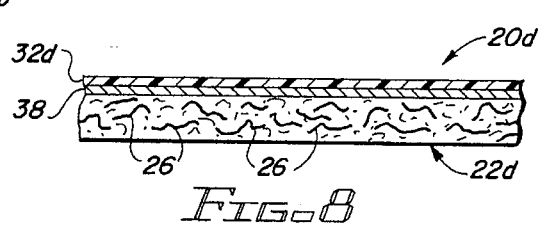
FIG. 9
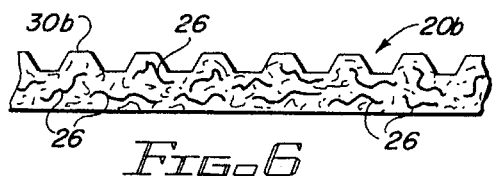
FIG. 7
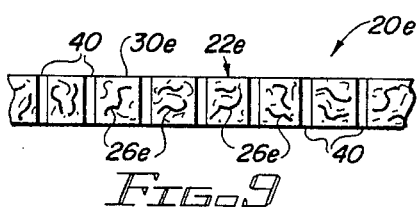
FIG. 8
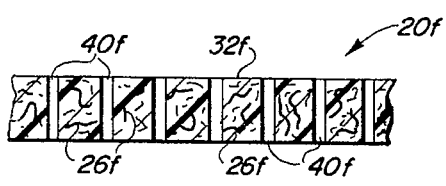
FIG. 10

CULINARY SHEET AND PAN LINER

BACKGROUND OF THE INVENTION

1. Field of the Invention

The present invention generally relates to the culinary arts and more particularly to an improved type of flexible culinary sheet and pan liner formed therefrom.

2. Prior Art

Various types of flexible sheets have been devised in the past for wrapping foods and/or for cooking and/or warming foods therein or in pans, trays or the like provided with liners made from such sheets. For example, paper sheets of cellulosic fibers have been used, as well as various types of thermoplastic and thermosetting films. Moreover, thin metal foils, so-called tin foils, which are in reality thin sheets of aluminum, are extensively used for cooking, heating and storing foods.

Various difficulties have arisen through the use of such sheets, films and liners made therefrom. For example, metal foils are notoriously easy to crack and break, so that foods wrapped therein frequently are not fully protected by the foil. Such foil is not easy to wrap closely around irregularly shaped roasts and the like, so that air gaps frequently remain between the foil and the food, leading to changes in taste in the food and eventual spoilage.

While paper sheets are useful for a variety of culinary purposes, their moisture and air transmissibility allow rapid spoilage of food wrapped therein. Accordingly, usually such thin plastic films as polyvinylidene chloride films, sold under the registered trademarks SARAN and CLING WRAP, are preferred for wrapping and preserving foods. However, such films stick to themselves and are difficult to handle and manage and are also very fragile.

Thermoplastic films with slightly greater durability such as polyethylene films and the like are extensively used for wrapping, storing and warming foods. Some of such films are opaque or translucent and therefore not very appealing.

Because each of the above-listed types of sheets or films has a number of drawbacks, certain recent inventions have been directed to providing combinations of such sheets and films. The results are generally expensive and still do not offer optimal properties. For example, those multi-layered combinations which employ metal foil sheets are still subject to breakage of the foil and ultimate failure to protect the foods disposed therein.

One such multi-layer, foil-containing wrapper is illustrated in U.S. Pat. No. 1,885,670 as a food bag or the like. Multi-layered plastic sheets are shown in U.S. Pat. No. 2,715,089. U.S. Pat. No. 4,965,135 shows similar multi-layered plastic sheet constructions. A cellulosic pad with a thermoplastic perforated film laminated thereto is shown in U.S. Pat. No. 3,320,075. A combination sheet employing a sheet of metal foil laminated to a cellulosic or rubber sheet is shown in U.S. Pat. No. 2,003,494. A fusible strip laminating two sheets of metal foil to each other is shown in U.S. Pat. No. 2,069,335. U.S. Pat. No. 2,150,058 discloses the use of a metal foil sheet with a surface coating of vinyl resin. U.S. Pat. No. 1,983,520 shows paper or plastic film laminated to a metal foil strip by wax.

A pan liner for pies and the like is formed of perforated metal foil connected to a cellulosic fiber layer (see U.S. Pat. No. 3,411,433). Various fluted and/or perforated metal foil pie pans and liners are shown in U.S. Pat. Nos. 2,802,411 and 2,570,060, as well as 2,027,296.

Despite the great diversity of combinations of metal foil, plastic films and/or cellulosic fiber paper, there remains a need for a simple, flexible, resilient, durable, culinary sheet and a pan liner made therefrom which sheet and liner have controlled thermal and other characteristics and are not subject to breakage during use.

SUMMARY OF THE INVENTION

The improved culinary sheet and liner of the present invention satisfy all the foregoing needs. Such sheet and liner are inexpensive, durable and efficient and incorporate a plurality of metal foil particles uniformly dispersed therethrough. The particles are embedded in a matrix of celulosic fibers, plastic film, or both, and do not separate from the sheet or liner and thus do not impair the visual appearance of food disposed therein, nor are they subject to being ingested with the food, in contrast to conventional metal foils, which easily break apart during use and can be ingested. This is an important safety feature.

The metal foil particles impart a desired strength to the sheet and liner and are present in a controlled concentration for optimal thermal transmission, as dictated by the uses to which the sheet and liner are to be subjected. The sheet and liner are substantially as set forth in the ABSTRACT OF THE DISCLOSURE.

Thus, the sheet and liner each comprise one or a plurality of plies of a body or matrix of cellulosic fibers or thermoplastic film, or both, in which a plurality of discrete metal foil particles are substantially uniformly and permanently embedded.

The metal foil can be of one or more of the following metals: aluminum, tin, copper, bronze, brass and titanium, preferably aluminum. Preferably, the cellulosic fibers are paper fibers derived from conventional sources such as wood plup, cotton rag fibers and the like.

In one preferred embodiment, the sheet and liner define a plurality of spaced holes or openings extending from the upper surface to the lower surface thereof and of preselected size to provide optimal thermal and moisture transmission. Plies of the sheet can be bonded together with wax and wax can be dispersed in the matrix to control the flexibility, water resistance and the like of the sheet and liner. The sheet and liner can be made in any suitable size, thickness, length, width and shape.

Further features of the improved culinary sheet and culinary pan liner of the present invention are set forth in the following detailed description and accompanying drawings.

DRAWINGS

FIG. 1 is a fragmentary schematic top plan view of a first preferred embodiment of the improved culinary sheet of the present invention;

FIG. 2 is a schematic side perspective view of the sheet of FIG. 1 in the form of a roll;

FIG. 3 is an enlarged fragmentary schematic side elevation of the sheet of FIG. 1;

FIG. 4 is an enlarged fragmentary schematic side elevation of a second preferred embodiment of the improved culinary sheet of the present invention;

FIG. 5 is an enlarged fragmentary schematic top plan view of a third preferred embodiment of the improved culinary sheet of the present invention;

FIG. 6 is an enlarged fragmentary schematic side elevation of the sheet of FIG. 5;

FIG. 7 is an enlarged fragmentary schematic side elevation of a fourth preferred embodiment of the improved culinary sheet of the present invention;

FIG. 8 is an enlarged fragmentary schematic side elevation of a fifth preferred embodiment of the improved culinary sheet of the present invention;

FIGS. 9, 10, 11 and 12 are, enlarged, fragmentary schematic side elevations of, respectively, sixth, seventh, eighth and ninth preferred embodiments of the improved culinary sheet of the present invention;

DETAILED DESCRIPTION

FIGS. 1–3

Figure 11:
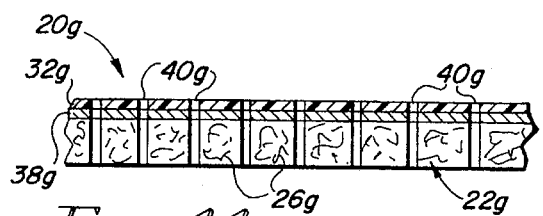

Now referring more particularly to FIGS. 1–3 of the drawings, a first preferred embodiment of the improved culinary sheet of the present invention is schematically depicted therein.

Thus, sheet 20 is shown, which comrpises a matrix 22 formed of a body of cellulosic fibers 24 in which are permanently embedded a plurality of discrete particles 26 of metal foil. Particles 26 are of one or more of the following metals: aluminum, copper, brass, bronze, tin and titanium, with aluminum being preferred because of its low cost, ductility and other properties, including superior thermal transmission.

Matrix 22 can be, for example, paper or paper board formed of wood pulp and/or cotton rag, etc., in a conventional manner and of any suitable thickness. Particles 26 can be of any suitable average diameter, for example 0.1–2 mm., and in any suitable concentration in the matrix, for example, about 1–20 weight percent of the matrix.

Particles 26 can be incorporated into and permanently embedded in matrix 22 in any suitable manner. For example, matrix 22 can be formed of a sheet of paper which has been ground up and uniformly dispersed in water to form a slurry of, for example, equal parts of paper and water. The slurry is stirred until the paper particles are thoroughly wetted, after which the particles 26 of metal foil are introduced into the slurry with stirring until uniformly dispersed therein. Thereafter, the slurry is screened to remove the water and the resulting pulp is rolled out and dried to form sheet 20 having matrix 22 in which particles 26 are permanently locked by fibers 24 into matrix 22. Sheet 20 can be rolled up to form the roll 28 shown in FIG. 3 before its sale and use.

Particles 26 can be formed in any suitable size before dispersing them in the slurry. Thus, metal foil (not shown) can be ground up separately from the paper or can be ground therewith and dispersed in the water to form the slurry with the paper. A higher concentration of particles 26 leads to greater thermal conductivity and less flexibility for sheet 20. However, durability for sheet 20 can also be increased when the concentration of particles 26 therein is increased up to about 20 weight percent of sheet 20. Thus, the particular uses to which sheet 20 is to be subjected dictate the particular optimal concentration of particles 26 in matrix 22.

It will also be understood that the thermal and durability characteristics of sheet 20 can also be influenced by the particular type of metal used for particles 26. Accordingly, sheet 20 can be engineered to fit optimally a number of different culinary uses by varying such particles and their concentrations, as well as the particular thickness and type of matrix fibers which are used in sheet 20.

FIG. 4

A second preferred embodiment of the improved culinary sheet of the present invention is schematically depicted in FIG. 4. Thus, sheet 20a is shown. Components thereof similar to those of FIGS. 1–3 bear the same numerals but are succceded by the letter "a". Sheet 20a differs from sheet 20 only as follows:

Particles 26a are not embedded in cellulosic matrix 22a but instead in a clear thermoplastic film 32 joined to the upper surface 34 of matrix 22a to form sheet 20a. Such thermoplastic film can be, for example, polyvinylidene chloride, polyethylene, polyvinyl acetate, polyvinyl chloride or the like. Particles 26a can be permanently embedded in film 30 by melting film 30 to form a molten body and stirring thereinto particles 26a and then quickly forming film 30 and cooling film 30 to solidify it. The result is a film with many properties of metal foil but with the flexibility of thermoplastic film. Such film 30 can be, for example, about 1–10 mils thick or another suitable thickness. By pouring the melted body of thermoplastic directly on the upper surface 34 of matrix 22 and causing it to form film 30, film 30 locks into the interstices of matrix 22a permanently bonding thereto. Sheet 20a has the other advantages of sheet 20.

FIGS. 5 AND 6

A third preferred embodiment of the improved culinary sheet of the present invention is schematically depicted in FIGS. 5 and 6. Thus, sheet 20b is shown. Components thereof similar to those of sheet 20 or 20a bear the same numerals but are succeeded by the letter "b".

Sheet 20b is substantially identical to sheet 20, except that sheet 20b has a corrugated upper surface 30b which increases the rigidity and integrity of sheet 20b. Particles 26b can, if desired, be poured in a water slurry onto upper surface 30b then drives particles 26b into surface 30b, locking them in place. Sheet 20b has the other advantages of sheet 20.

FIG. 7

A fourth preferred embodiment of the improved culinary sheet of the present invention is schematically depicted in FIG. 7. Thus, sheet 20c is shown. Components thereof similar to those of sheet 20a bear the same numerals but are succeeded by the letter "c".

Sheet 20c is substantially identical to sheet 20a, except sheet 20c is formed entirely of thermoplastic film and there is no cellulosic matrix present. Metal foil particles 26c are substantially uniformly embedded throughout the body of sheet 20c, as by melting sheet 20c, distributing particles 26c in the melted sheet and then cooling sheet 20c. Particles 26c strengthen sheet 20c.

FIG. 9

A sixth preferred embodiment of the improved culinary sheet of the present invention is schematically depicted in FIG. 9. Thus, sheet 20e is shown. Components thereof similar to those of sheet 20 bear the same numerals but are succeeded by the letter "e". Sheet 20e is identical to sheet 20, except that sheet 20e has a plurality of spaced openings

40, preferably of small size, such as 0.01 inch or so in diameter, extending from upper surface 30e to lower surface 42 thereof to control the passage of heat and moisture through sheet 20e.

FIGS. 10, 11 AND 12

Figure 12:
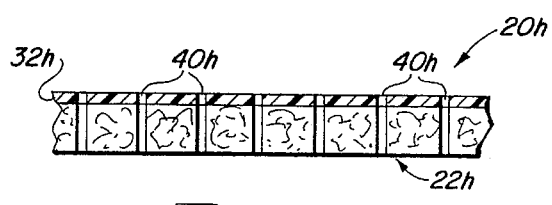

Seventh, eighth and ninth preferred embodiments of the improved culinary sheet of the present invention are schematically depicted in FIGS. 10, 11 and 12, respectively. Numerals the same as those previous embodiments, except for the addition of identifying letters, refer to components similar to those of previous embodiments.

FIG. 10 shows sheet 20f, substantially identical to sheet 20c, except for the addition of openings 40f similar to openings 40 of FIG. 9. Culinary sheet 20g of FIG. 11 is substantially identical to sheet 20d, except for the addition of openings 40g thereto. Culinary sheet 20h of FIG. 12 is substantially identical to sheet 20a, except for the addition of openings 40h thereto.

FIGS. 13 AND 14

Figure 13:
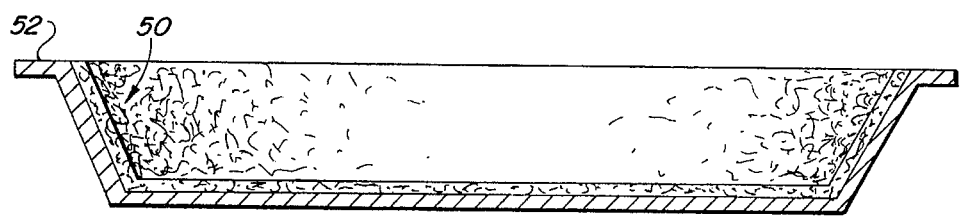
FIG. 13 is a schematic vertical section of a preferred embodiment of the culinary pan liner of the present invention, shown within a culinary pan; and, FIG. 14 is an enlarged, fragmentary schematic side elevation of the liner of FIG. 13.
Figure 14:
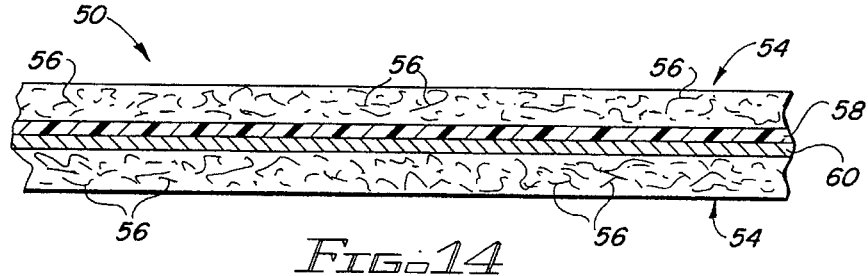

An improved culinary pan liner in accordance with the present invention is schematically depicted in FIGS. 13 and 14. Thus, a pan liner 50 is shown disposed in a warming pan 52. Pan liner 50 is formed from a sheet similar to sheet 20, except as follows:

Pan liner 50 comprises a spaced pair of cellulosic paper sheets 54 of sufficient thickness to be self-supporting and having a plurality of metal foil particles 56 substantially uniformly embedded throughout. Sheets 54 are joined together by two intermediate layers 58 and 60, layer 58 being a thermoplastic sheet and layer 60 being wax.

It will be understood that liner 50 could be formed, if desired, from any of the previously described sheets 20 through 20h, in place of the particular construction shown in FIGS. 13 and 14. In any event, one or more layers of liner 50 bear the metal foil particles distributed therethrough in order to control the strength, flexibility, durability and thermal properties of liner 50.

Various other modifications, changes, alterations and additions can be made in the improved sheet and liner of the present invention, and in their components and parameters. All such modifications, changes, alterations and addtiions as are within the scope of the appended claims form part of the present invention.

What is claimed is:

1. An improved flexible culinary sheet, said sheet comprising, in combination:

a) a matrix of at least one of cellulosic fibers and thermoplastic film; and, b) a plurality of discrete metal foil particles substantially uniformly distributed throughout and retained within said matrix, said sheet having improved durability and thermal transfer properties, said sheet defining a plurality of openings disposed therethrough.

2. The improved sheet of claim 1 wherein said metal foil is at least one of aluminum foil, copper foil, bronze foil, tin foil, titanium foil and brass foil.

3. The improved sheet of claim 2 wherein said sheet has said openings spaced along the length and width thereof and extending from the upper surface of said sheet to the lower surface of said sheet.

4. The improved sheet of claim 3 wherein said openings are dimensioned to serve as thermal and moisture conduits through said sheet.

5. An improved flexible culinary sheet, said sheet comprising, in combination:

a) a matrix of at least one of cellulosic fibers and thermoplastic film; and, b) a plurality of discrete metal foil particles substantially uniformly distributed throughout and retained within said matrix, said sheet having improved durability and thermal transfer properties, said sheet including wax.

6. The improved sheet of claim 5 wherein said sheet is multi-ply and wherein said wax is disposed between said plies to bond said plies together.

7. An improved flexible culinary sheet, said sheet comprising, in combination:

a) a matrix of at least one of cellulosic fibers and thermoplastic film; and, b) a plurality of discrete metal foil particles substantially uniformly distributed throughout and retained within said matrix, said sheet having improved durability and thermal transfer properties, said sheet including a layer of paper and a layer of thermoplastic film, said film incorporating said foil particles therein.

8. The improved sheet of claim 7 wherein said thermoplastic film is bonded to said paper by a layer of wax.

9. An improved culinary pan liner, said liner comprising, in combination:

a) a matrix comprising at least one of cellulosic fibers and thermoplastic film; and, b) a plurality of discrete metal foil particles substantially uniformly distributed throughout said matrix, said liner defining a plurality of openings therethrough.

10. The improved culinary pan liner of claim 9 wherein said metal foil is at least one of aluminum foil, copper foil, bronze foil, tin foil, titanium foil and brass foil.

11. The improved culinary pan liner of claim 9 wherein said liner has said openings spaced along the length and width thereof and extending from the upper surface of said liner to the lower surface of said liner.

12. The improved culinary pan liner of claim 11 wherein said openings are dimensioned to serve as thermal and moisture conduits through said liner.

13. The improved culinary pan liner of claim 9 wherein said liner includes wax.

14. The improved culinary pan liner of claim 13 wherein said liner is multi-ply and wherein said wax is disposed between said plies to bond said plies together.

15. The improved culinary pan liner of claim 9 wherein said liner includes a layer of paper and a layer of thermoplastic film, said film incorporating said foil particles therein.

16. The improved culinary pan liner of claim 15 wherein said thermoplastic film is bonded to said paper by a layer of wax.

17. The improved culinary pan liner of claim 15 wherein said paper includes said metal foil particles.

18. An improved flexible culinary sheet, said sheet comprising, in combination:

a) a matrix of at least one of cellulosic fibers and thermoplastic film; and, b) a plurality of discrete metal foil particles substantially uniformly distributed throughout and permanently embedded within said matrix, said sheet having improved durability and thermal transfer properties; said particles having an average diameter of about 0.1–2 mm.

19. The improved sheet of claim 1 wherein said metal foil is at least one of aluminum foil, copper foil, bronze foil, tin foil, titanium foil and brass foil, in a concentration of about 1–20 weight percent of the matrix.

* * * * *